(12) United States Patent
Miyazaki

(10) Patent No.: US 7,375,754 B2
(45) Date of Patent: May 20, 2008

(54) SOLID STATE IMAGE PICKUP DEVICE

(75) Inventor: Keizo Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 603 days.

(21) Appl. No.: 10/915,390

(22) Filed: Aug. 11, 2004

(65) Prior Publication Data
US 2005/0110886 A1 May 26, 2005

(30) Foreign Application Priority Data
Aug. 21, 2003 (JP) .............................. 2003-297521

(51) Int. Cl.
*H04N 3/14* (2006.01)
*H04N 5/335* (2006.01)

(52) U.S. Cl. .................................................. 348/308

(58) Field of Classification Search ................ 348/294, 348/302, 303, 307–310, 308, 272, 266, 222, 348/312, 229.1
See application file for complete search history.

(56) References Cited

U.S. PATENT DOCUMENTS

| | | | |
|---|---|---|---|
| 4,630,031 A * | 12/1986 | Upton | 341/161 |
| 5,585,856 A | 12/1996 | Nakaya et al. | 348/441 |
| 6,522,359 B1 * | 2/2003 | Yamashita | 348/312 |
| 2001/0008419 A1 * | 7/2001 | Sano et al. | 348/222 |
| 2001/0028409 A1 * | 10/2001 | Watanabe et al. | 348/554 |
| 2002/0154225 A1 * | 10/2002 | Matsumoto et al. | 348/229.1 |

FOREIGN PATENT DOCUMENTS

| EP | 0932304 A2 | 7/1999 |
|---|---|---|
| JP | 3-70212 A | 3/1991 |
| JP | 09-009017 A | 1/1997 |

* cited by examiner

*Primary Examiner*—Ngoc-Yen Vu
*Assistant Examiner*—Kent Wang
(74) *Attorney, Agent, or Firm*—Fitzpatrick, Cella, Harper & Scinto

(57) ABSTRACT

The present invention provides a solid state image pickup device capable of readily discriminating a break between data in a serial output data. The solid state image pickup device includes an image sensor having a plurality of pixels, an analog-to-digital converter for converting analog signals outputted from the plurality of pixels of the image sensor into digital data, the solid state image pickup device serving to output pixel output data after the analog-to-digital conversion in the form of serial data, and discrimination pulse generating means for generating and outputting a discrimination pulse used to discriminate one data time period of the serial data.

9 Claims, 10 Drawing Sheets

SOLID STATE IMAGE PICKUP DEVICE

BACKGROUND OF THE INVENTION

1. Field of the Invention

The present invention relates in general to a solid state image pickup device, and more particularly to a solid state image pickup device having an analog-to-digital converter (hereinafter referred to as "an A/D converter" for short when applicable).

2. Related Background Art

In recent years, the importance of a solid state image pickup device used in digital imaging apparatuses has more and more increased along with the spread of a digital still camera, a digital video camera, an image scanner, and a mobile phone with a digital camera.

In many cases, in each of these digital imaging apparatuses, analog signals obtained from the solid state image pickup device are converted into digital signals by an A/D converter which is separately installed in order to execute image processing or the like for the resultant digital signals.

However, in the recent progress in the miniaturization and the promotion of low cost of these digital imaging apparatuses, it has been required to provide the A/D converter in the solid state image pickup device.

Now, heretofore, in the solid state image pickup device with an A/D converter, as described in JP 09-009017 A as Japanese Patent Application Laid-open for example, it is the main processing to output data after the digital conversion in parallel with one another. In this case, output terminals are required corresponding to the number of bits of the data. For example, in case of a solid state image pickup device having an A/D converter for 8 bits, eight output terminals are required, and in case of a solid state image pickup device having an A/D converter for 12 bits, twelve output terminals are required.

For this reason, in the solid state image pickup device having a relatively small image pickup area, a ratio of an area occupied by the output terminals becomes relatively large as compared with the overall chip size. This becomes a factor of increasing a chip cost. In addition, in a package in which a solid state image pickup device is sealed, an increase in the number of output terminals results in an increase in the package size. This is a factor of increasing a package cost.

The above-mentioned tendency becomes more remarkable when an image sensor and an A/D converter, and moreover a timing generator are formed on the same semiconductor substrate.

Furthermore, in recent years, the radiation noises generated by an electric apparatus are questioned with respect to an influence exerted on the human body or other electric apparatuses. These radiation noises are generated by a current which is caused to instantaneously flow through a wiring and the like when a voltage changes from a high level to a low level or from a low level to a high level. In case of the parallel output style, there is a possibility that the data of the bits changes at the same timing. Hence, the peak values of the radiation noises further increase as the number of bits of the A/D converter further increases, i.e., the number of output terminals further increases.

For this reason, an attempt has been made such that the data after the digital conversion is outputted in serial with one another in order to reduce the number of output terminals for digital data.

FIG. 10 is a diagram explaining the processing for serial data outputted by a conventional solid state image pickup device with a built-in A/D converter of a serial data output type. In the figure, reference numeral 510 designates a solid state image pickup device with a built-in A/D converter of a serial data output type, reference numeral 500 designates a start pulse for regulating start of an operation of the solid state image pickup device 510 with a built-in A/D converter, reference numeral 501 designates serial output data of 8 bits into which analog signals outputted from respective pixels are digitally converted, reference numeral 503 designates a clock pulse, reference numeral 521 designates a time period from a time point of input of the start pulse 500 to a time point of output of the effective data, reference numeral 523 designates a time period required to output one data, and reference numeral 505 designates a microprocessor (MPU) for image processing. As can be seen from the figure, in order that the microprocessor 505 for image processing may discriminate a break between the serial data outputted from the solid state image pickup device 510, first of all, the start pulse 500 is detected, and the number of clocks for the predetermined time period 521 is then counted to thereby recognize the head bit of the effective data. Thereafter, the clock pulses for eight periods within the time period 523 required to output one data are counted to thereby recognize the head bit of next one data. Such processing is repeatedly executed to thereby discriminate a break between the serial data two by two. For discriminating the break between the serial data in such a manner, the number of clocks needs to be always counted.

As described above, in case of the serial output style, the digital data is continuously outputted through one terminal. Thus, unlike the case where the data is outputted in parallel with one another, as the processing for discriminating the break between the data two by two, it becomes necessary to always count the number of clock pulses. For this reason, the load imposed on the microprocessor for image processing in a latter stage becomes heavier than that in the case where the parallel output data is processed.

SUMMARY OF THE INVENTION

The present invention relates in general to a solid state image pickup device with a built-in A/D converter of a serial data output type, and is suitably used in a solid state image pickup device having an image sensor and an A/D converter provided on the same substrate. The solid state image pickup device according to the present invention is suitably used in a digital imaging apparatus such as a digital still camera, a digital video camera, an image scanner or a mobile phone with a digital camera.

It is, therefore, an object of the present invention to provide a solid state image pickup device with a built-in A/D converter of a serial data output type which is capable of readily discriminating a break between data without always counting the number of clock pulses.

In order to attain the above-mentioned object, the feature of the present invention is that in addition to serial data, a pulse output used to discriminate a break between data is added.

That is, according to the present invention, a solid state image pickup device includes an image sensor having a plurality of pixels, an analog-to-digital converter for converting analog signals outputted from the plurality of pixels of the image sensor into digital data, the solid state image pickup device serving to output pixel output data after the analog-to-digital conversion in the form of serial data; and discrimination pulse generating means for generating and outputting a discrimination pulse used to discriminate one data time period of the serial data.

As described above, according to the solid state image pickup device of the present invention, since it is easy to discriminate a break between data even in the case where the data is outputted in serial, a load imposed on a microprocessor for image processing in a latter stage is lightened.

DESCRIPTION OF THE PREFERRED EMBODIMENTS

Preferred embodiments of the present invention will hereinafter be described in detail with reference to the accompanying drawings.

First Embodiment

Figure 1:
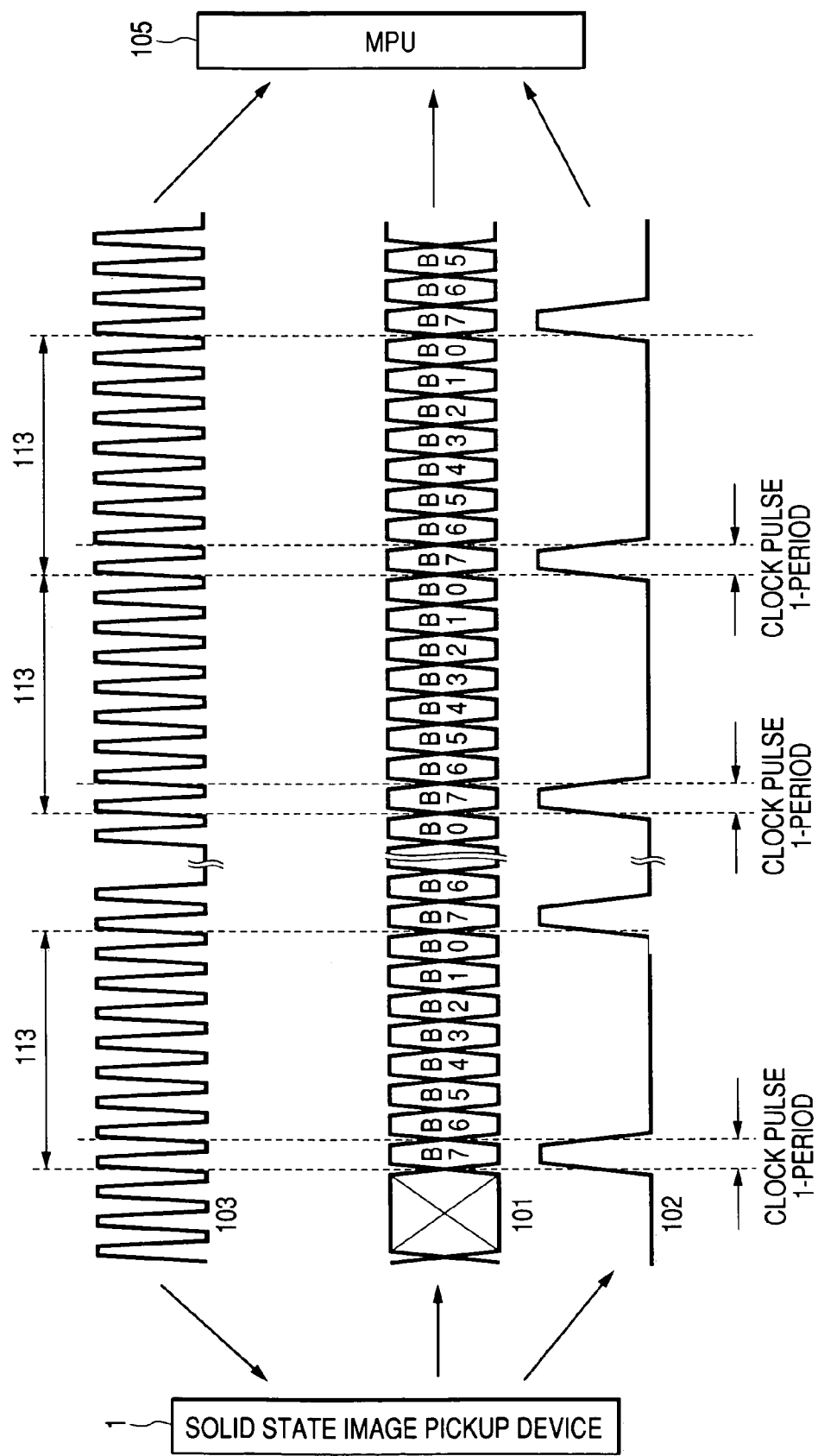
FIG. 1 is a diagram explaining an operation of a solid state image pickup device with a built-in A/D converter according to a first embodiment of the present invention.

FIG. 1 is a diagram showing a constitution of a first embodiment of the present invention. In the figure, reference numeral 1 designates a solid state image pickup device with a built-in A/D converter which has an image pickup unit of an area generator type, reference numeral 101 designates serial output data of 8 bits into which analog signals outputted from respective pixels are digitally converted, reference numeral 102 designates an output pulse for data discrimination, reference numeral 103 designates a clock pulse, reference numeral 113 designates a time period required to output one data, and reference numeral 105 designates a microprocessor (MPU) for image processing. In this embodiment, the output pulse 102 for data discrimination is outputted for a time period corresponding to one period of the clock pulse 103 from a time point of output of the head bit of the serial output data from the solid state image pickup device 1 with a built-in A/D converter. Thus, the microprocessor 105 for image processing provided in a latter stage judges that the serial output data 101, outputted for the time period in which the output pulse 102 for data discrimination is at a high level, is the head bit of one data in the time period 113 required to output the one data. As a result, the time period of the one data can be readily discriminated.

Figure 2:
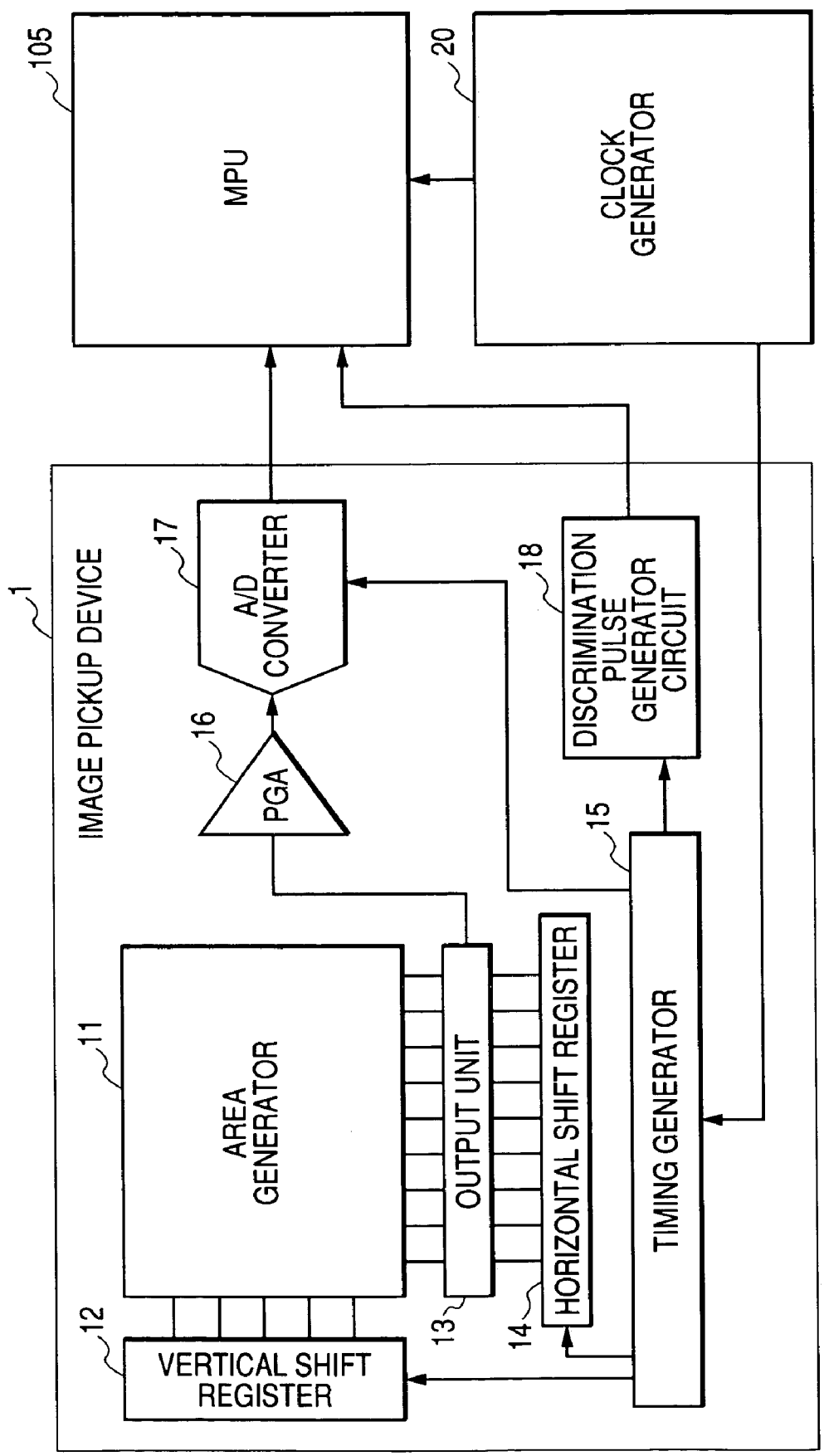
FIG. 2 is a block diagram concretely showing a configuration of the solid state image pickup device with a built-in A/D converter according to the first embodiment of the present invention.

FIG. 2 is a block diagram concretely showing a configuration of the above-mentioned solid state image pickup device 1 with a built-in A/D converter. The solid state image pickup device 1 with a built-in A/D converter includes an area generator 11, a vertical shift register 12 for controlling an accumulation operation, a reading-out operation and the like of the area generator 11, an output unit 13 for outputting signals from the area generator 11, a horizontal shift register 14 for successively scanning the contents of the output unit 13 to output the signals in the form of serial data, a programmable gain amplifier (PGA) 16 for amplifying the output signal from the output unit 13, an A/D converter 17 for A/D-converting an output signal from the PGA 16, a discrimination pulse generator circuit 18 for sending a data discriminating pulse to the MPU 105, and a timing generator 15 for sending a synchronizing signal to each of the vertical shift register 12, the horizontal shift register 14, the A/D converter 17, and the discrimination pulse generator circuit 18.

The serial output data 101 is outputted from the A/D converter 17 to the MPU 105, the output pulse 102 for data discrimination is outputted from the discrimination pulse generator circuit 18 to the MPU 105, and the clock pulse 103 is outputted from the clock generator 20 to each of the area generator 11 and the MPU 105.

Figure 3:
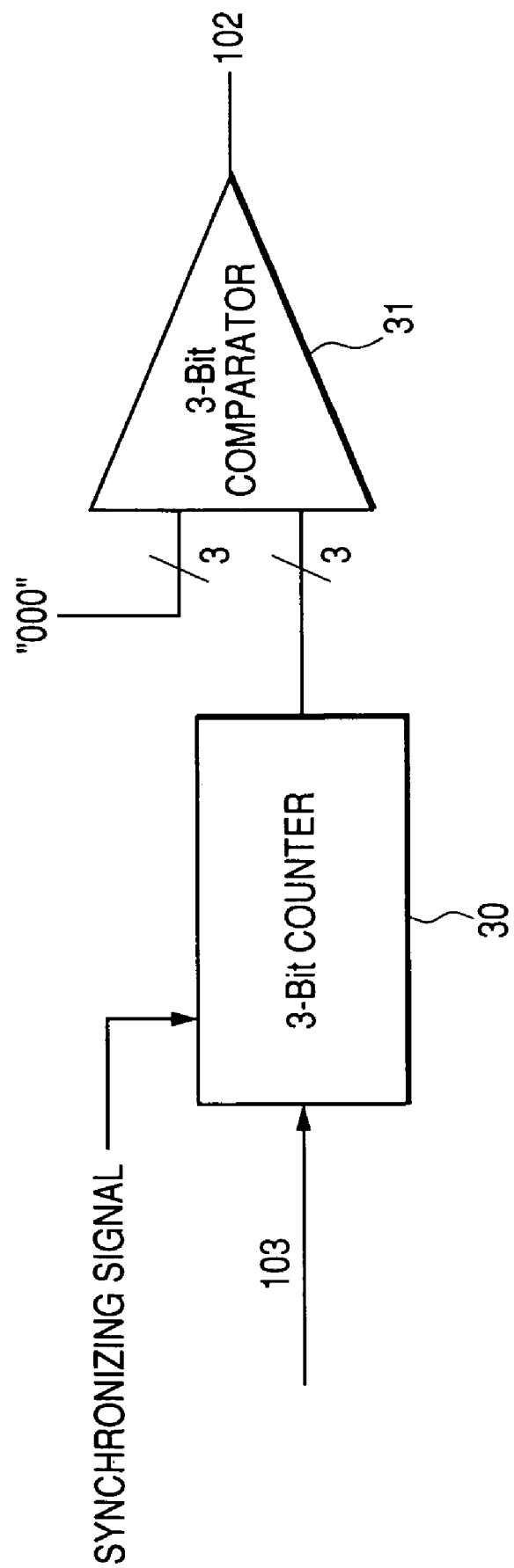
FIG. 3 is a circuit diagram showing a configuration of a discrimination pulse generator circuit in the solid state image pickup device with a built-in A/D converter according to the first embodiment of the present invention.

FIG. 3 is a circuit diagram showing a configuration of the discrimination pulse generator circuit 18. The clock pulse 103 and the synchronizing signal are inputted to a 3-bit counter 30. Upon input of the clock pulses for 8 bits, "000" for one period of the clock pulse is inputted to one terminal of a 3-bit comparator 31. "000" has already been inputted to the other terminal of the 3-bit comparator 31. Thus, upon input of "000" for one period of the clock pulse to the one terminal of the 3-bit comparator 31, the 3-bit comparator 31 outputs the output pulse 102 for data discrimination for one period of the clock pulse. Thus, the output pulse 102 for data discrimination exhibiting the head of one data is outputted for every 8 clock pulses 103.

While in the above-mentioned embodiment, the image sensor has been described as the area generator in which a plurality of pixels are two-dimensionally disposed, the present invention is not intended to be limited thereto. That is to say, the present invention may also be applied to a line generator in which a plurality of pixels are one-dimensionally disposed.

Second Embodiment

Figure 4:
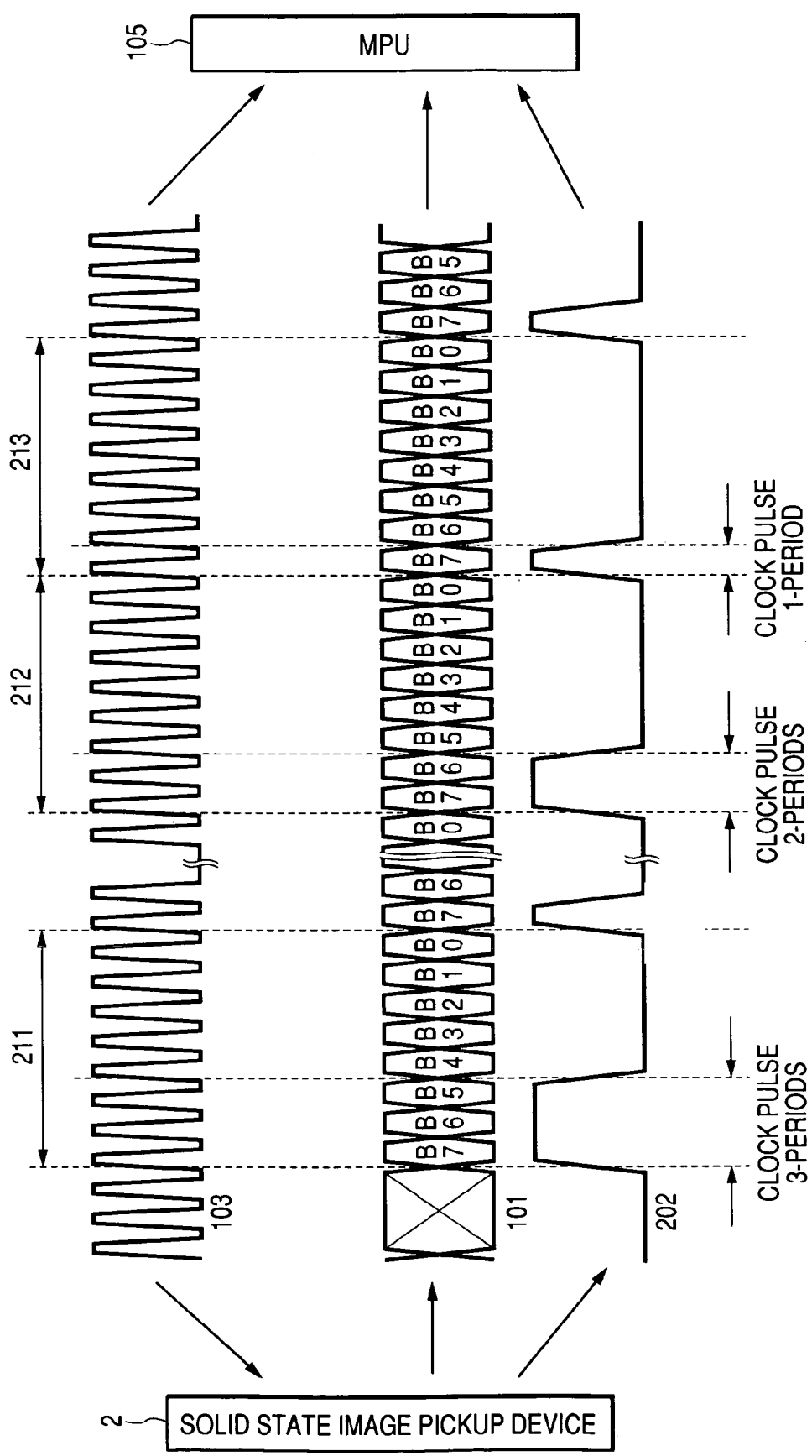
FIG. 4 is a diagram explaining an operation of a solid state image pickup device with a built-in A/D converter according to a second embodiment of the present invention.

FIG. 4 is a diagram showing a constitution of a second embodiment of the present invention. In the figure, reference numeral 2 designates a solid state image pickup device with a built-in A/D converter which has an image pickup unit of an area generator type, reference numeral 202 designates output pulse for data discrimination, reference numeral 211 designates a time period required to output one data from the pixels in and after the head pixel for one frame, reference numeral 212 designates a time period required to output one data from the pixels in and after the head pixel for one horizontal line, and reference numeral 213 designates a time period required to output one data from other normal pixels. In the figure, the same constituent elements and pulses (data) as those in FIG. 1 are designated with the same reference numerals, and their detailed description is omitted here for the sake of simplicity. In this embodiment, when one data of the head of one frame output is outputted, the output pulse 202 for data discrimination is outputted for a time period for three periods of the clock pulse 103 from a time point when the head bit is outputted. When one data of the head of one horizontal output is outputted, the output pulse 202 for data discrimination is outputted for a time period for two periods of the clock pulse 103 from a time point when the head bit is outputted. Also, when one data of other outputs is outputted, the output pulse 202 for data discrimination is outputted for a time period for one period of the clock pulse 103 from a time point when the head bit is outputted. As a result, the microprocessor 105 for image processing in the latter stage can judge that the serial output data 101 outputted for a time period right after the output pulse 202 for data discrimination goes to a high level is the head bit for each of the time periods 211, 212 and 213 each required to output one data. Thus, it becomes possible to readily discriminate the time period for one data. Hence, when the output pulse 202 for data discrimination is outputted for the time period for three periods of the clock pulse 103, it becomes possible to readily discriminate the serial output data 101 outputted for a time period right after the output pulse 202 for data discrimination goes to the high level as one data of the head of the output data for one frame. When the output pulse 202 for data discrimination is outputted for the time period for two periods of the clock pulse 103, it becomes possible to readily discriminate the serial output data 101 outputted for a time period right after the output pulse 202 for data discrimination goes to the high level as one data of the head of the output data for one horizontal line. Also, when the output pulse 202 for data discrimination is outputted for the time period for one period of the clock pulse 103, it becomes possible to readily discriminate the serial output data 101 outputted for a time period right after the output pulse 202 for data discrimination goes to the high level as one data of the output data from other normal pixels.

Figure 5:
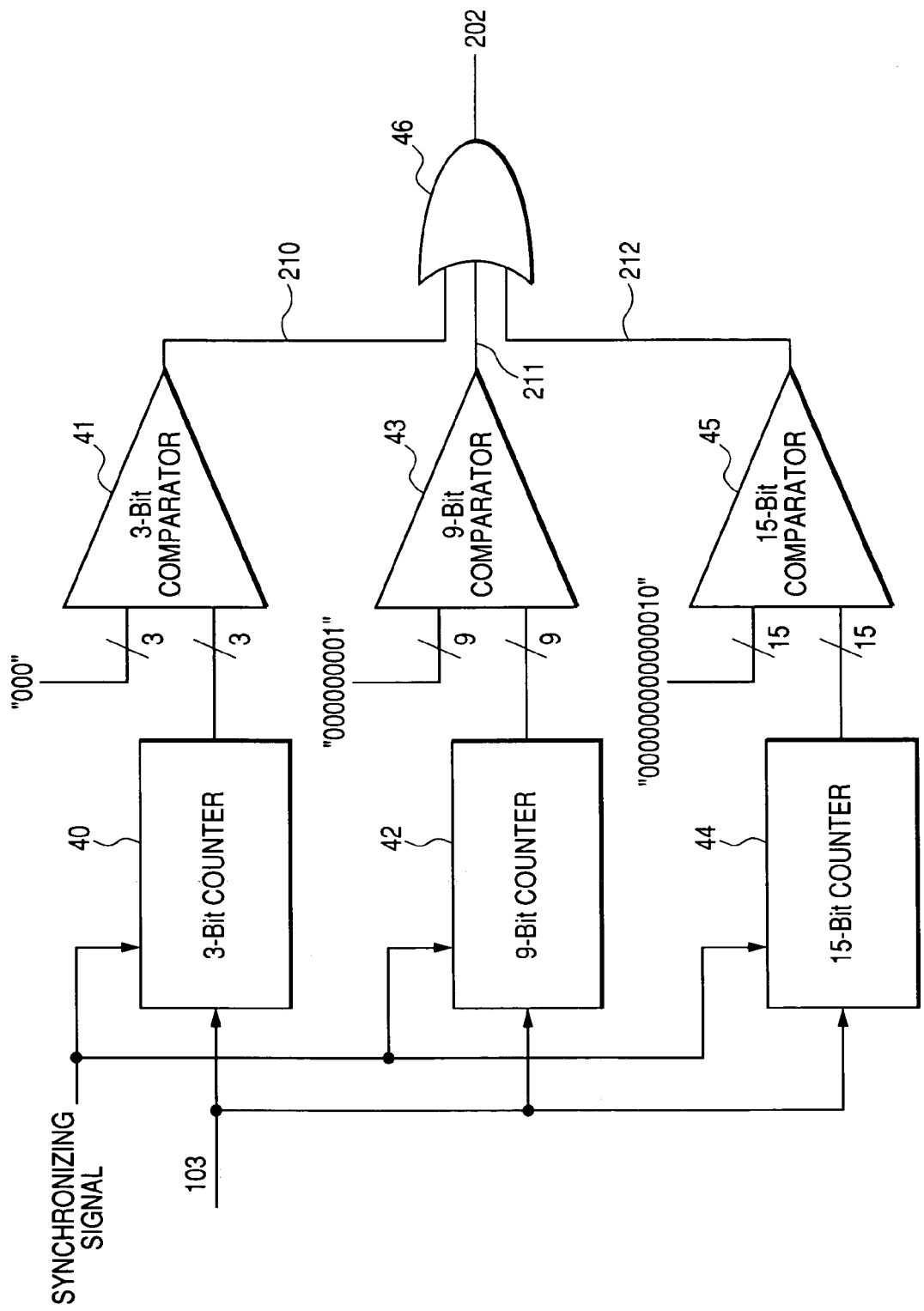
FIG. 5 is a circuit diagram showing a configuration of a discrimination pulse generator circuit in the solid state image pickup device with a built-in A/D converter according to the second embodiment of the present invention.
Figure 6:
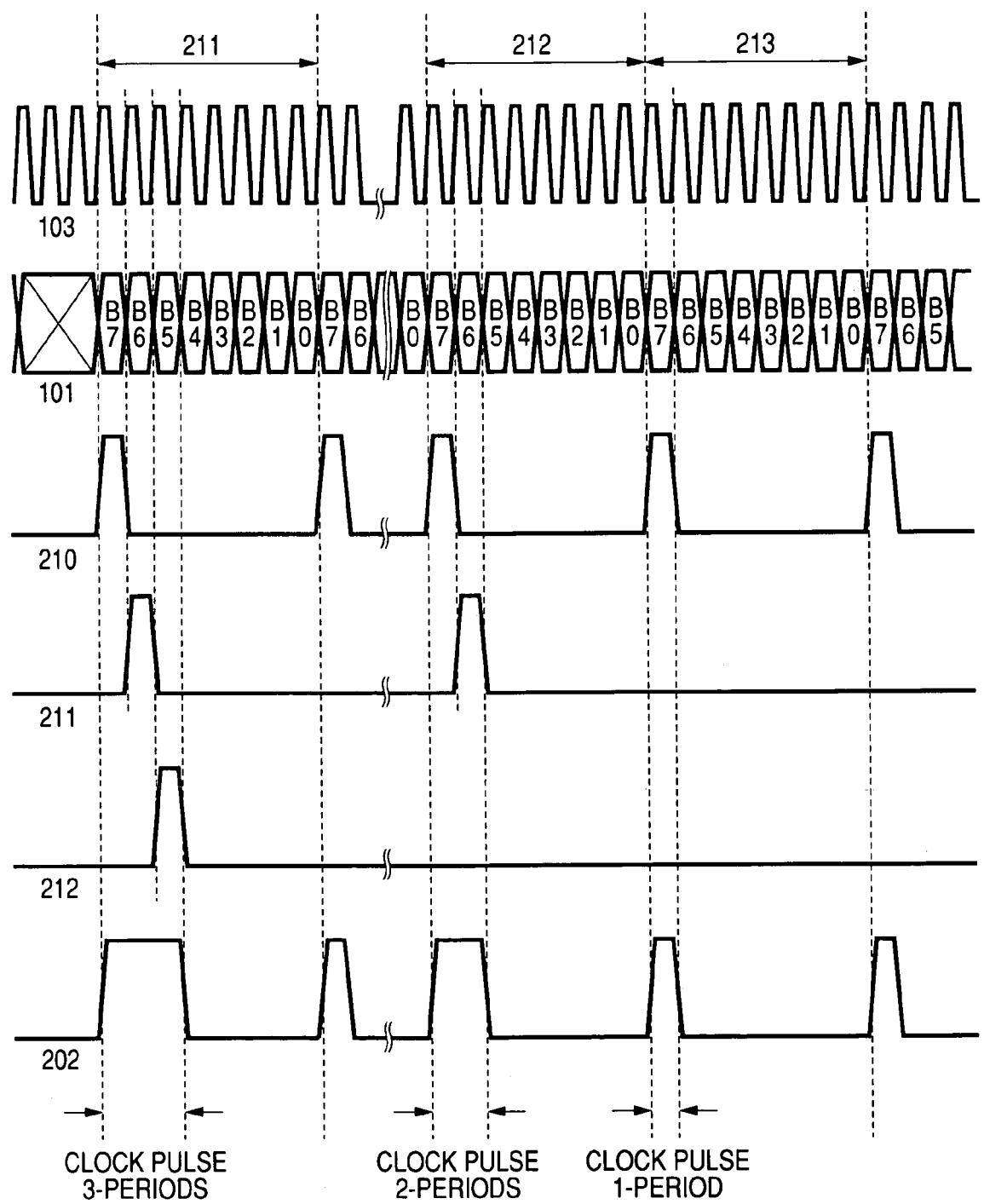
FIG. 6 is a timing chart showing an operation of the discrimination pulse generator circuit in the solid state image pickup device with a built-in A/D converter according to the second embodiment of the present invention.

While a configuration of the solid state image pickup device 2 with a built-in A/D converter is the same as that shown in FIG. 2, in this embodiment, the circuit configuration of the discrimination pulse generator circuit 18 shown in FIG. 2 is changed into a circuit configuration shown in FIG. 5. FIG. 5 is a circuit diagram showing a configuration of the discrimination pulse generator according to the second embodiment of the present invention, and FIG. 6 is a timing chart explaining an operation of the discrimination pulse generator in the second embodiment. It should be noted that the circuit configuration of FIG. 5 is an example in which the head data of the output data for one horizontal line is outputted for every 64 data, and the head data of the output data for one frame is outputted every lapse of 64 horizontal time periods. In this embodiment, the clock pulse 103 and the synchronizing signal are inputted to each of a 3-bit counter 40, a 9-bit counter 42, and a 15-bit counter 44.

When the clock pulse for 8 bits is inputted to the 3-bit counter 40, "000" for one period of the clock pulse is inputted to one terminal of a 3-bit comparator 41. "000" has already been inputted to the other terminal of the 3-bit comparator 41. Thus, when "000" is inputted to the one terminal, a pulse 210 for one period of the clock pulse is outputted.

When the clock pulse for 8×64 bits is inputted to the 9-bit counter 42, "000000001" for one period of the clock pulse is inputted to one terminal of a 9-bit comparator 43. "000000001" has already been inputted to the other terminal of the 9-bit comparator 43. Thus, when "000000001" is inputted to the one terminal, a pulse 211 for one period of the clock pulse is outputted.

When the clock pulse for 8 ×64 ×64 bits is inputted to the 15-bit counter 44, "000000000000000010" for one period of the clock pulse is inputted to one terminal of a 15-bit comparator 45. "000000000000000010" has already been inputted to the other terminal of the 15-bit comparator 45. Thus, when "000000000000000010" is inputted to the one terminal, a pulse 212 for one period of the clock pulse is outputted.

The output signals from the 3-bit comparator 41, a 9-bit comparator 43 and a 15-bit comparator 45 are inputted to an OR circuit 46 which outputs in turn the output pulse 202 for data discrimination. Then, when only the output signal of the 3-bit comparator 41 is inputted to the OR circuit 46, a pulse for one period of the clock pulse 103 is outputted from the OR circuit 46. When the output signals of the 3-bit comparator 41 and the 9-bit comparator 43 are inputted to the OR circuit 46, a pulse for two periods of the clock pulse 103 is outputted from the OR circuit 46. Also, when the output signals of the 3-bit comparator 41, the 9-bit comparator 43 and the 15-bit comparator 45 are inputted to the OR circuit 46, a pulse for three periods of the clock pulse 103 is outputted from the OR circuit 46.

Thus, the pulse for one period of the clock pulse 103 exhibiting the head of the data is outputted for every 8 clock pulses, the pulse for two period of the clock pulse 103 exhibiting the head of the output data for one horizontal line is outputted for every 64 data, and the pulse for three period of the clock pulse 103 exhibiting the head of the output data for one frame is outputted every lapse of 64 horizontal time periods.

Third Embodiment

Figure 7:
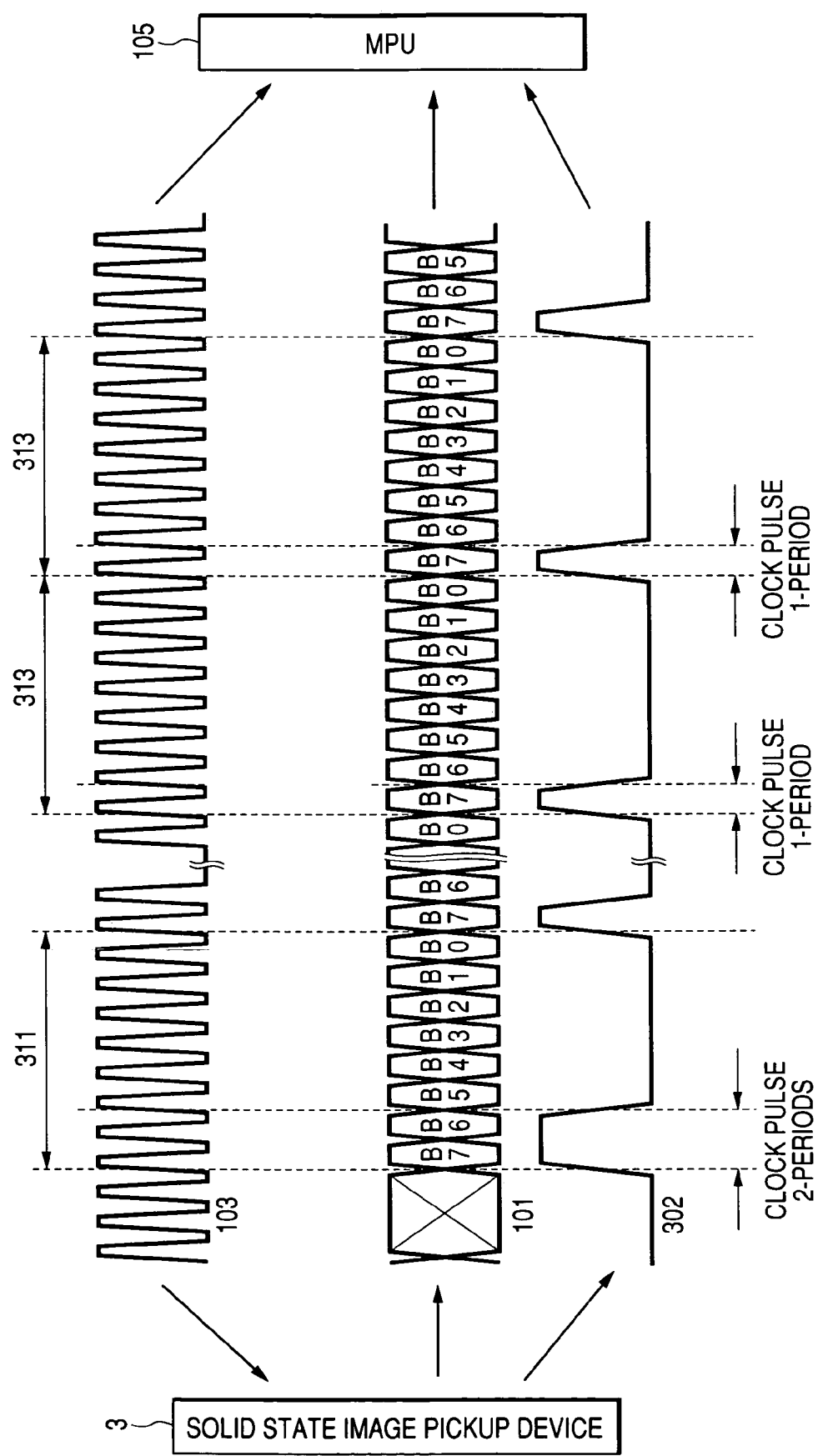
FIG. 7 is a diagram explaining an operation of a solid state image pickup device with a built-in A/D converter according to a third embodiment of the present invention.

FIG. 7 is a diagram showing a constitution of a third embodiment of the present invention. In the figure, reference numeral 3 designates a solid state image pickup device with a built-in A/D converter which has an image pickup unit of an area generator type, reference numeral 302 designates output pulse for data discrimination, reference numeral 311 designates a time period required to output one data from the pixels in and after the head pixel for one frame, and reference numeral 313 designates a time period required to output one data from other normal pixels. In the figure, the same constituent elements and pulses (data) as those in FIG. 1 are designated with the same reference numerals, and their detailed description is omitted here for the sake of simplicity. In this embodiment, when one data of the head of one frame output is outputted, the output pulse 302 for data discrimination is outputted for a time period for two periods of the clock pulse 103 from a time point when the head bit is outputted. When one data of other outputs is outputted, the output pulse 302 for data discrimination is outputted for a time period for one period of the clock pulse 103 from a time point when the head bit is outputted. As a result, the microprocessor for image processing in the latter stage can judge that the serial output data 101 outputted for a time period right after the output pulse 302 for data discrimination goes to a high level is the head bit for each of the time periods 311, and 313, each of which is a time period required to output one data. Thus, it becomes possible to readily discriminate the time period for one data. Hence, when the output pulse 302 for data discrimination is outputted for the time period for two periods of the clock pulse 103, it becomes possible to readily discriminate the serial output data 101 outputted for a time period right after the output pulse 302 for data discrimination goes to the high level as one data of the head of the output data, and when the output pulse 302 for data discrimination is outputted for the time period for one period of the clock pulse 103, it becomes possible to readily discriminate the serial output data 101 outputted for a time period right after the output pulse 302 for data discrimination goes to the high level as one data of the output data from other normal pixels.

Figure 8:
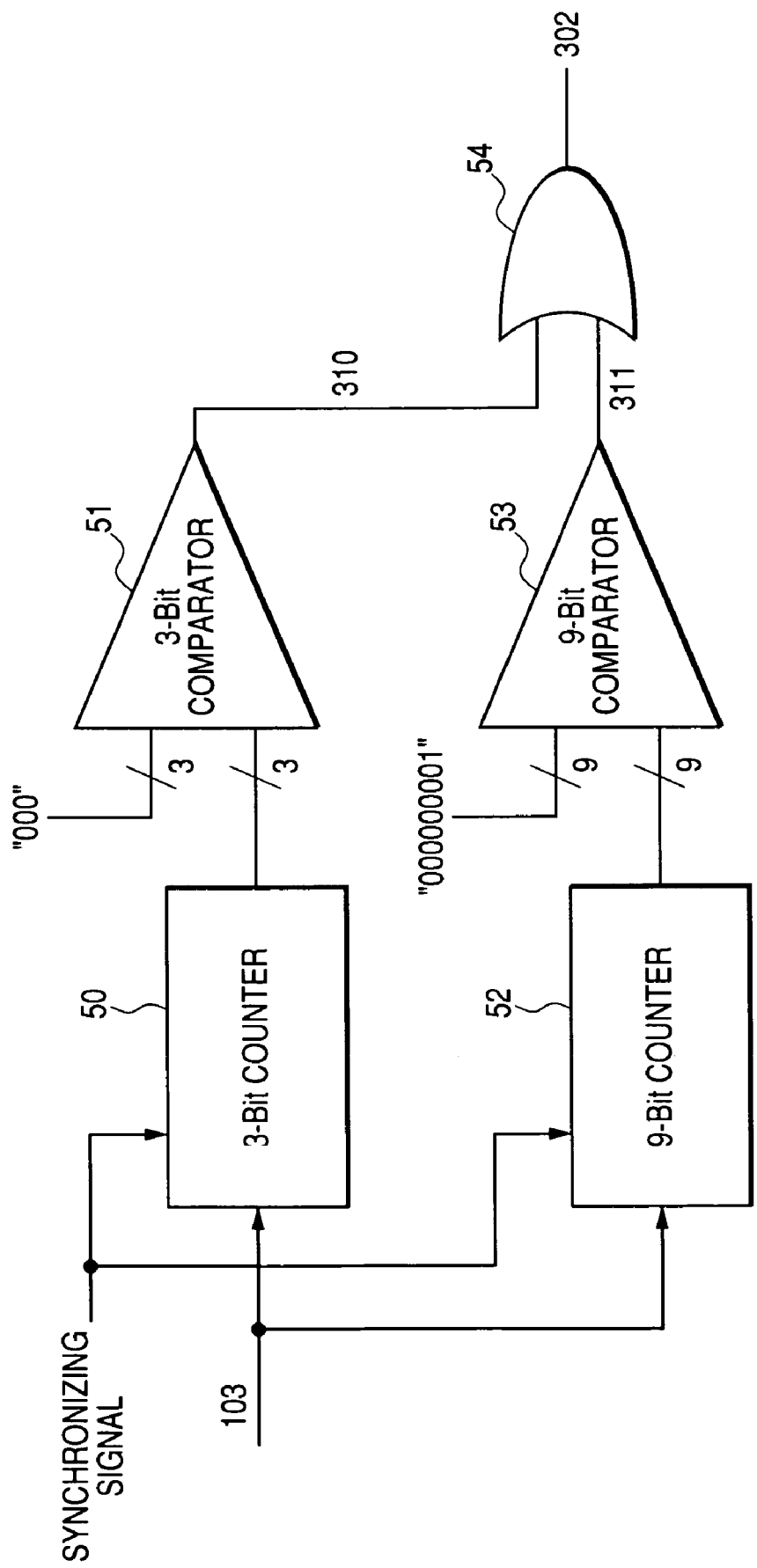
FIG. 8 is a circuit diagram showing a configuration of a discrimination pulse generator circuit in the solid state image pickup device with a built-in A/D converter according to the third embodiment of the present invention.
Figure 9:
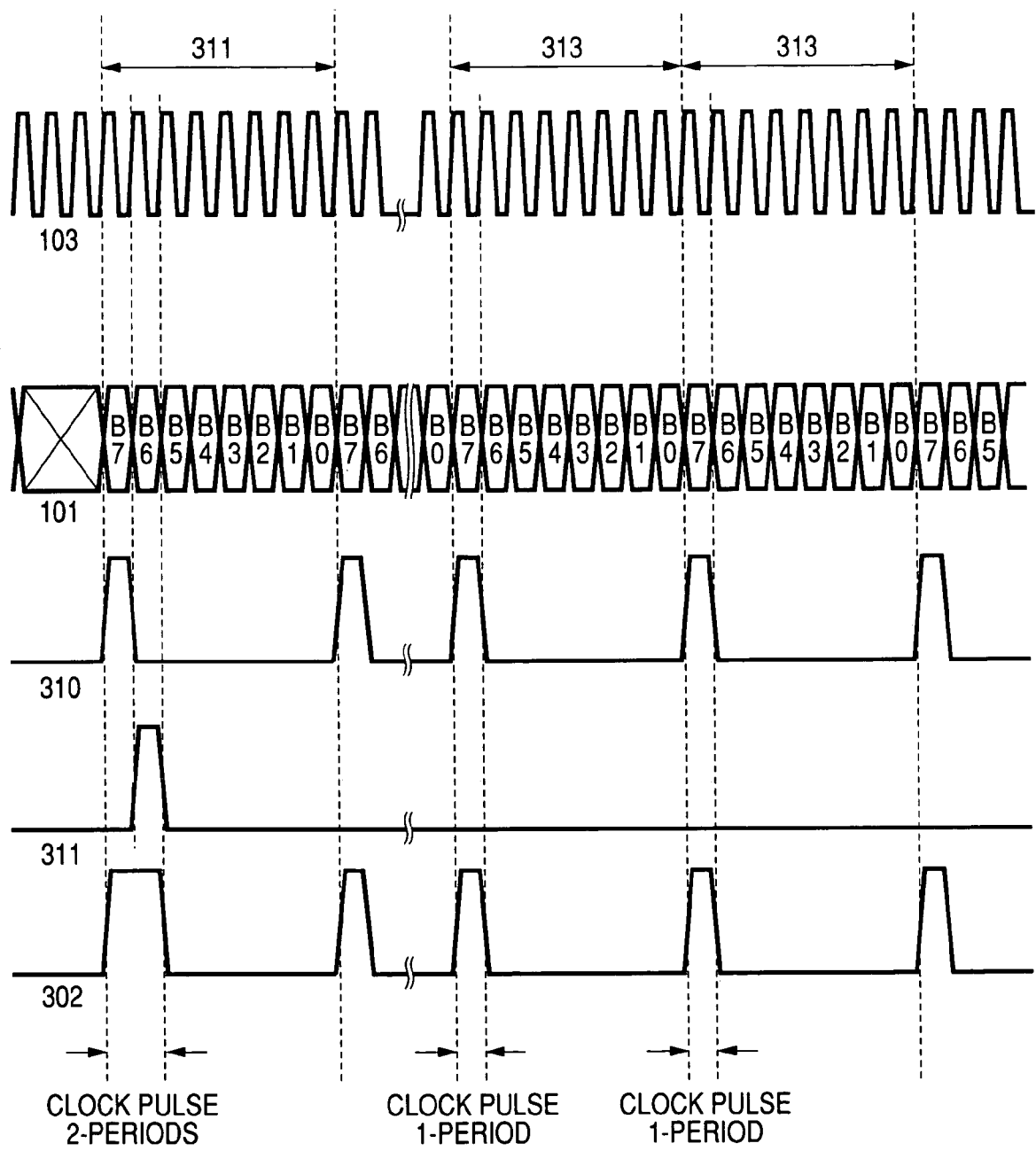
FIG. 9 is a timing chart showing an operation of the discrimination pulse generator circuit in the solid state image pickup device with a built-in A/D converter according to the third embodiment of the present invention.
Figure 10:
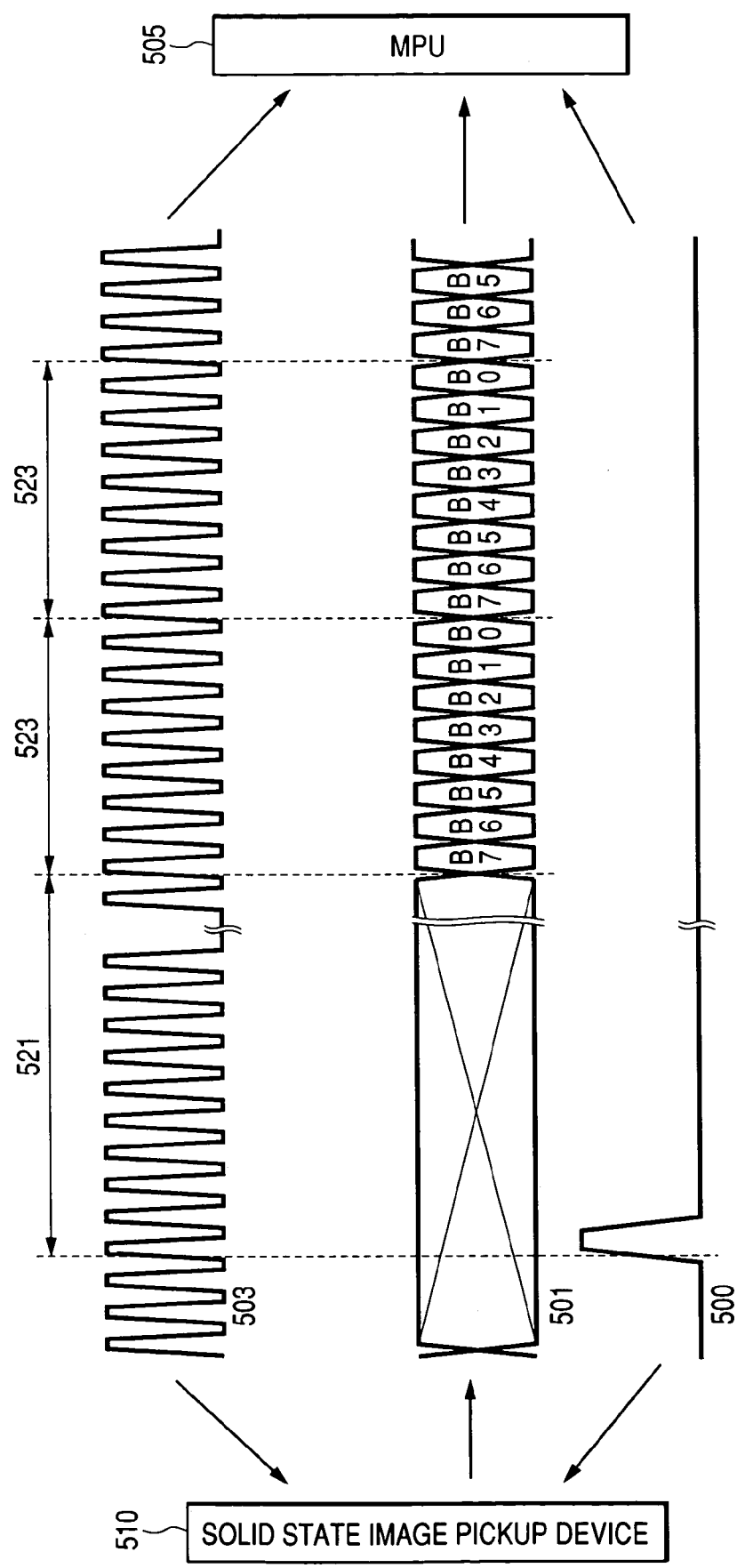
FIG. 10 is a diagram explaining an operation of a solid state image pickup device with a built-in A/D converter of a related art example.

A basic circuit configuration of the solid state image pickup device 3 with a built-in A/D converter is the same as that shown in FIG. 2. However, in this embodiment, the area generator is replaced with a line generator, the vertical shift register 12 becomes unnecessary, and also the circuit configuration of the discrimination pulse generator circuit 18 shown in FIG. 2 is changed into a circuit configuration shown in FIG. 8. FIG. 8 is a circuit diagram showing a configuration of the discrimination pulse generator circuit in the third embodiment of the present invention, and FIG. 9 is a timing chart explaining an operation of the discrimination pulse generator circuit in the third embodiment of the present invention. It should be noted that the circuit configuration shown in FIG. 8 is an example in which the head data of the output data for one horizontal line is outputted for every 64 data.

The clock pulse 103 and the synchronizing signal are inputted to each of a 3-bit counter 50 and a 9-bit counter 52.

When the clock pulse for 8 bits is inputted to the 3-bit counter 50, "000" for one period of the clock pulse is inputted to one terminal of a 3-bit comparator 51. "000" has already been inputted to the other terminal of the 3-bit comparator 51. Thus, when "000" is inputted to the one terminal, a pulse 310 for one period of the clock pulse is outputted.

When the clock pulse for 8 ×64 bits is inputted to the 9-bit counter 52, "000000001" for one period of the clock pulse is inputted to one terminal of a 9-bit comparator 53. "000000001" has already been inputted to the other terminal of the 9-bit comparator 53. Thus, when "000000001" is inputted to the one terminal, a pulse 311 for one period of the clock pulse is outputted.

The output signals of the 3-bit comparator 51 and the 9-bit comparator 53 are inputted to an OR circuit 54 which outputs in turn an output pulse 302 for data discrimination. Then, when only the output signal of the 3-bit comparator 51 is inputted to the OR circuit 54, a pulse for one period of the clock pulse 103 is outputted, and when the output signals of the 3-bit comparator 51 and the 9-bit comparator 53 are inputted to the OR circuit 54, a pulse for two periods of the clock pulse 103 is outputted.

Thus, the pulse for one period of the clock pulse 103 exhibiting the head of one data is outputted for every 8 clock pulses, and the pulse for two periods of the clock pulse 103 exhibiting the head of the output data for one horizontal line is outputted for every 64 data.

The area generator (a line generator), the A/D converter, the discrimination pulse generator circuit, the timing generator and the like are preferably formed on the same semiconductor substrate (the same chip) in terms of the mounting. However, all the constituent elements are not necessarily provided on the same semiconductor substrate, and hence the discrimination pulse generator circuit and the like may be provided outside the semiconductor substrate.

This application claims priority from Japanese Patent Application No. 2003-297521 filed Aug. 21, 2003, which is hereby incorporated by reference herein.

What is claimed is:

1. A solid state image pickup device comprising:
   an image sensor having a plurality of pixels;
   an analog-to-digital converter for converting analog signals outputted from the plurality of pixels of the image sensor into digital data, the solid state image pickup device serving to output pixel output data as serial data after analog-to-digital conversion; and
   discrimination pulse generating means for outputting, from a single output terminal, a discrimination pulse used to discriminate one data time period of the serial data, wherein the discrimination pulse is modulated such that a pulse width at a time of outputting data of a top pixel in a frame, a pulse width at a time of outputting data of a top pixel in a horizontal scanning period, and a pulse width at a time of outputting data of other pixels are different from each other.

2. A solid state image pickup device according to claim 1, further comprising:
   a timing generator for generating a timing pulse used to drive the image sensor, the analog-to-digital converter, and the discrimination pulse generating means.

3. A solid state image pickup device according to claim 1, wherein the image sensor, the analog-to-digital converter, and the discrimination pulse generating means are formed on the same semiconductor substrate.

4. A solid state image pickup device according to claim 2, wherein the image sensor, the analog-to-digital converter, the discrimination pulse generating means and the timing generator are formed on the same semiconductor substrate.

5. A solid state image pickup device according to claim 1, wherein the image sensor is an area image sensor.

6. A solid state image pickup device according to claim 1, wherein the image sensor is a line image sensor.

7. A solid state image pickup device according to claim 1, wherein a width of the discrimination pulse used to discriminate one data time period of the serial data is changed for predetermined pixel output data.

8. A solid state image pickup device according to claim 7, wherein there is a variation in a pulse width of the discrimination pulse used to discriminate one data time period of the serial data, at a time when output data from a head pixel is outputted, and at a time when output data from other pixels is outputted.

9. The solid state image pickup device according to claim 1, wherein the discrimination pulse generating means includes a first counter for generating the discrimination pulse at the time of outputting data of the other pixels, a second counter for generating the discrimination pulse at the time of outputting data of a top pixel in a horizontal scanning period, and a third counter for generating the discrimination pulse at the time of outputting data of a top pixel in a frame.

* * * * *